United States Patent Office
3,328,132
Patented June 27, 1967

3,328,132
METHOD OF SEPARATING UF$_6$ FROM BROMINE FLUORIDES
Melvin R. Bennett, Oak Ridge, and George I. Cathers, Knoxville, Tenn., assignors to the United States of America as represented by the United States Atomic Energy Commission
No Drawing. Filed Nov. 15, 1966, Ser. No. 594,635
4 Claims. (Cl. 23—337)

ABSTRACT OF THE DISCLOSURE

This disclosure describes a method of separating UF$_6$ from bromine fluorides by selective sorption of UF$_6$ on sodium fluoride at 100° C. to 175° C. A mixture of gases containing UF$_6$ and BrF$_3$ is contacted with fluorine to convert BrF$_3$, which is partially sorbed on NaF, to BrF$_5$, which is not sorbed thereon.

---

The invention described herein was made in the course of, or under, a contract with the U.S. Atomic Energy Commission.

Our invention relates to volatilization methods of separating uranium values from extraneous impurities.

Bromine pentafluoride is potentially useful as a fluorinating agent for converting uranium oxides to uranium hexafluoride. For example, U$_3$O$_8$ is converted to the hexafluoride in accordance with the reaction:

$$9BrF_5 + U_3O_8 \rightarrow 9BrF_3 + 3UF_6 + 4O_2$$

One advantage of BrF$_5$ is a fluorinating agent is that it does not fluorinate plutonium oxides, and a separation of uranium from plutonium can be effected in the fluorination step. However, the use of BrF$_5$ as a fluorinating agent requires that a method be provided for separating bromine fluorides from UF$_6$.

It is accordingly one object of our invention to provide a method of separating UF$_6$ from bromine fluorides.

Other objects of our invention will become apparent from the following description and claims.

We have discovered that BrF$_3$ and BrF$_5$ exhibit different sorption characteristics on NaF at a temperature where UF$_6$ is sorbed thereon, BrF$_3$ being partially sorbed and BrF$_5$ not being sorbed on the NaF. This discovery leads the way to a method of separating UF$_6$ from bromine fluorides by a modification to the well-known process of separating UF$_6$ from extraneous impurities by selective sorption and desorption on sodium fluoride. In accordance with our invention we have therefore provided an improvement in a process of separating UF$_6$ from a mixture of gases wherein BrF$_3$ is one component of said mixture comprising contacting said mixture with NaF under conditions whereby UF$_6$ is sorbed thereon and then increasing the temperature of the NaF to remove sorbed UF$_6$ therefrom, said improvement comprising contacting said BrF$_3$ with fluorine in an amount sufficient to convert said BrF$_3$ to BrF$_5$ before removing the UF$_6$ from the NaF.

Studies into the mechanism of our process indicate that BrF$_3$ is complexed with UF$_6$ on the NaF as a ternary composition, BrF$_3$-UF$_6$-NaF. Therefore, in the absence of fluorination of BrF$_3$ to BrF$_5$, the UF$_6$ product will contain up to one mole of BrF$_3$ per mole of UF$_6$.

In carrying out our invention, the mixture of gases containing UF$_6$ and bromine fluorides is contacted with NaF at a temperature at which UF$_6$ is sorbed thereon, i.e., at 100° C. to 175° C. In this temperature range BrF$_3$ is partially sorbed on the NaF, but BrF$_5$ is not. The BrF$_3$ is fluorinated to BrF$_5$ by contacting it with fluorine. The quantity of fluorine must be in stoichiometric excess of the amount required to convert all the BrF$_3$ to BrF$_5$ in accordance with the equation:

$$BrF_3 + F_2 \rightarrow BrF_5$$

in order to achieve maximum separation of UF$_6$ from bromine fluorides. An excess of over 100 percent is preferred. This contact may be achieved by adding fluoride to the gas mixture before the mixture is contacted with NaF; or, alternately, fluorine may be passed over NaF containing sorbed UF$_6$ and BrF$_3$. If desired, a portion of the BrF$_3$ may be fluorinated before the mixture is in contact with NaF and the remainder while BrF$_3$ is sorbed on the NaF.

If the BrF$_3$ is completely fluorinated by adding fluorine to the gas mixture and the resulting mixture is then passed over NaF, virtually no bromine will be sorbed on the NaF, and substantially pure UF$_6$ can be immediately desorbed from the NaF by heating, preferably to a temperature of 300° C. to 400° C.

If the BrF$_3$ is not completely fluorinated before the mixture is contacted with NaF, the BrF$_3$ that is sorbed on the NaF may be separated from UF$_6$ by passing fluorine over the NaF at a temperature of 100° C. to 175° C. Analysis of the effluent gases to show the concentration of bromine evolved at any specific time will indicate the concentration of bromine remaining on the NaF at that time. After bromine has been removed from the NaF to the desired extent, the UF$_6$ may be removed by raising the temperature, preferably to 300° C. to 400° C., and sweeping the UF$_6$ away from the NaF by another gas such as fluorine or helium.

Any gas-solids contacting method may be used in carrying out our invention; however, contact accomplished in a fluidized bed of finely divided NaF particles is highly efficient and is preferred.

Having thus described our invention, the following example is offered to illustrate it in more detail.

Example

Two grams of UF$_4$ were fluorinated at 500° C. with 20 percent BrF$_5$—80 percent He. The product gas consisting of UF$_6$, BrF$_5$, BrF$_3$, and helium was passed through a 5-gram bed of NaF at 150° C. The bed was then flushed with fluorine at a rate of 100 ml./minute for one hour at 150° C. The UF$_6$ was then removed from the bed by increasing the bed temperature to 375° C. and passing fluorine through it at 100 ml./minute for one hour.

Analysis of the UF$_6$ showed that the bromine contamination of the UF$_6$ was less than 40 p.p.m.

As can be seen from this example, the concentration of bromine in the UF$_6$ desorbed from the NaF bed is low.

The foregoing example is offered to illustrate, not to limit, our invention, and it should be limited only as set forth in the following claims.

It is obvious that modifications may be made, such as changes in temperature, gas composition, gas flow rates, and composition of gases used to sweep UF$_6$ from the NaF, without departing from our invention.

We claim:
1. In a process of separating UF$_6$ from a mixture of gases containing said UF$_6$ and BrF$_3$ wherein said gaseous mixture is contacted with NaF at a temperature sufficient to sorb $UF_6$ and $BrF_3$ thereon, and then after which $UF_6$ is removed from said NaF the improvement which comprises contacting said $BrF_3$ with fluorine in an amount sufficient to convert said $BrF_3$ to $BrF_5$ prior to the step of removing $UF_6$ from said NaF.

2. The method of claim 1 wherein said gaseous mixture contains $UF_6$, $BrF_5$, and $BrF_3$.

3. The method of claim 1 wherein fluorine is provided in said gaseous mixture.

4. The method of claim 1 wherein $BrF_3$ is contacted with fluorine after its sorption on said bed of NaF.

No references cited.

CARL D. QUARFORTH, *Primary Examiner.*

S. TRAUB, *Assistant Examiner.*